(12) United States Patent
Zheng et al.

(10) Patent No.: US 11,003,649 B2
(45) Date of Patent: May 11, 2021

(54) INDEX ESTABLISHMENT METHOD AND DEVICE

(71) Applicant: ALIBABA GROUP HOLDING LIMITED, Grand Cayman (KY)

(72) Inventors: Bowen Zheng, Hangzhou (CN); Yue Pan, Hangzhou (CN); Chuangxian Wei, Hangzhou (CN)

(73) Assignee: ALIBABA GROUP HOLDING LIMITED, Grand Cayman (KY)

( * ) Notice: Subject to any disclaimer, the term of this patent is extended or adjusted under 35 U.S.C. 154(b) by 200 days.

(21) Appl. No.: 15/996,237

(22) Filed: Jun. 1, 2018

(65) Prior Publication Data

US 2018/0276264 A1   Sep. 27, 2018

Related U.S. Application Data

(63) Continuation of application No. PCT/CN2016/106581, filed on Nov. 21, 2016.

(30) Foreign Application Priority Data

Dec. 1, 2015 (CN) .......................... 201510868254.X

(51) Int. Cl.
  *G06F 16/22* (2019.01)
  *G06F 16/31* (2019.01)
  *G06F 16/00* (2019.01)

(52) U.S. Cl.
  CPC .......... *G06F 16/2272* (2019.01); *G06F 16/00* (2019.01); *G06F 16/221* (2019.01);
  (Continued)

(58) Field of Classification Search
  CPC ... G06F 16/221; G06F 16/2272; G06F 16/951
  See application file for complete search history.

(56) References Cited

U.S. PATENT DOCUMENTS 5,404,510 A    4/1995  Smith et al.
5,907,837 A *  5/1999  Ferrel ................. G06F 16/9574
(Continued)

FOREIGN PATENT DOCUMENTS

CN    101609460 A      12/2009
CN    103390066 A  *   11/2013
(Continued)

OTHER PUBLICATIONS

European Patent Office Communication issued for Application No. 16869893.4 which encloses the extended European Search Report which includes pursuant to Rule 62 EPC, the Supplementary European Search Report (Art. 153(7) EPC) and the European search opinion, dated Aug. 9, 2019, 7 pages.

(Continued)

*Primary Examiner* — Irete F Ehichioya
*Assistant Examiner* — Ken Hoang
(74) *Attorney, Agent, or Firm* — Finnegan, Henderson, Farabow, Garrett & Dunner, LLP

(57) ABSTRACT

Embodiments of the present invention provide an index establishment method and device. The method can include determining, according to index status information of a column in a database within a preset time threshold, whether an index is to be established for the column; determining an index type according to the data information of the column; and establishing the index for the column according to the index type based on the determination that the index is to be established for the column.

18 Claims, 6 Drawing Sheets

(52) U.S. Cl.
CPC ...... *G06F 16/2237* (2019.01); *G06F 16/2246* (2019.01); *G06F 16/2255* (2019.01); *G06F 16/319* (2019.01)

(56) References Cited

U.S. PATENT DOCUMENTS

| | | |
|---|---|---|
| 7,640,244 B1 | 12/2009 | Morris et al. |
| 2006/0212264 A1 | 9/2006 | Barsness et al. |
| 2010/0250504 A1 | 9/2010 | Balasubramanian et al. |
| 2011/0282864 A1* | 11/2011 | Collins ............. G06F 16/24534 707/719 |
| 2012/0078879 A1* | 3/2012 | Shuma ................ G06F 16/2228 707/715 |
| 2013/0041887 A1* | 2/2013 | Egan ........................ G06F 16/22 707/718 |
| 2014/0317093 A1 | 10/2014 | Sun et al. |
| 2014/0337354 A1 | 11/2014 | Blank, Jr. |
| 2015/0032720 A1* | 1/2015 | James ..................... G06F 16/21 707/713 |
| 2016/0147886 A1* | 5/2016 | Demir ................. G06F 16/2237 707/745 |
| 2018/0091306 A1* | 3/2018 | Antonopoulos ........ G06F 21/57 |

FOREIGN PATENT DOCUMENTS

| | | | |
|---|---|---|---|
| CN | 103390066 A | | 11/2013 |
| CN | 103810212 A | | 5/2014 |
| CN | 104182460 A | | 12/2014 |
| CN | 104714984 A | | 6/2015 |
| CN | 104834736 A | | 8/2015 |
| CN | 105045851 A | * | 11/2015 |
| JP | S63201716 A | | 8/1988 |
| JP | H0785093 A | | 3/1995 |
| JP | 2007122405 A | | 5/2007 |
| JP | 2008198237 A | | 8/2008 |
| JP | 2009129202 A | | 6/2009 |
| WO | WO 2017/092583 A1 | | 6/2017 |

OTHER PUBLICATIONS

PCT International Search Report and Written Opinion dated Jan. 26, 2017, issued in corresponding International Application No. PCT/CN2016/106581 (12 pages).

First Chinese Office Action issued in Chinese Application No. CN201510868254.x, dated Aug. 30, 2019, 7 pages.

First Chinese Search Report issued in Chinese Application No. CN201510868254.x dated Aug. 21, 2019, 2 pages.

Japanese Search Report issued in corresponding Japanese Application No. 2018-524442 dated Nov. 24, 2020 (11 pages).

Suzumura, Kotaro, "From the foundation of Part3 ER model to Kotaro and re-review an understanding and data design of the data structure which gazed also at the cloud age," DB Magazine, vol. 19, No. 6, pp. 34-41 (2009).

"Texture the structure of the database which he understands from Ayako and the foundation," The Nikkei software, vol. 5, No. 1, pp. 56-85 (2001).

Hiroyuki, Umeda, "The practice power of database development in which he does not master with a textbook," The Nikkei software, vol. 9, No. 9, pp. 48-58 (2006).

Japanese Office Action issued in corresponding Japanese Application No. 2018-524442 dated Dec. 16, 2020 (15 pages).

* cited by examiner

INDEX ESTABLISHMENT METHOD AND DEVICE

CROSS REFERENCE TO RELATED APPLICATION

The disclosure claims the benefits of priority to International application number PCT/CN2016/106581, filed Nov. 21, 2016, and Chinese application number 201510868254.X, filed Dec. 1, 2015, both of which are incorporated herein by reference in their entireties.

BACKGROUND

An index is a structure for sorting values in one or more columns in a database table. Information in the database table can be rapidly accessed by using an index. Indexes provide pointers pointing to data values stored in columns of the table. These pointers are then sorted according to a sorting order specified by a user. An index can be searched to find a specific value, and a row including the value can be determined according to a pointer.

With the continuous development of Internet technology, a massive amount of data is generated from people's daily activities on the Internet. How to rapidly find required data from the stored massive amount of data becomes a major concern for technical personnel. A user can specify an index type for an index in a conventional database. However, for a same index type, different types of data can have different lengths of query time. As a result, if an index type is inappropriately set, a user may spend an excessively long period of time to make a query in a database, resulting in a poor user experience.

Conventionally, existing index types are limited and lead to poor query performance in some scenarios.

Index types of conventional data are limited and are dominated by B-Tree indexes. B-Tree indexes are not suitable for all data features. For example, search speeds are very slow for the Key-Value mode. In Structured Query Language (SQL) with joins, multiple searches will be performed for one SQL. The performance of SQL with joins can be severely affected if a B-Tree is used for searching.

Furthermore, conventionally, logs are manually analyzed to optimize indexes, resulting in poor operability and maintainability.

Indexes bring very high maintenance costs for a conventional database having a large amount of data. Consequently, user access logs can be viewed every night to decide which columns require new indexes, which columns do not need indexes, and which columns are to be combined to establish a combined index. Such automatic adjustment of index types by using history statistics (e.g., history-based optimization (HBO)) is completely manual, resulting in very poor operability and maintainability.

Therefore, how to combine the usage of a database to establish suitable indexes for columns in the database to improve data retrieval efficiency and save operation and maintenance resources becomes a technical problem.

SUMMARY OF THE DISCLOSURE

Embodiments of the disclosure provide an index establishment method. The method can include: determining, according to index status information of a column in a database within a time threshold, whether an index is to be established for the column; determining an index type according to the data information of the column; and establishing an index for the column according to the index type based on a determination that an index is to be established for the column.

In some embodiments, the method further includes: in response to the determination that an index is not to be established for the column, determining, after the time threshold, whether an index is to be established for the column.

In some embodiments, determining, according to the index status information of the column in the database within the time threshold, whether an index is to be established for the column further comprises: acquiring the index status information of the column within the time threshold; determining, according to the index status information, whether an index is used for the column within the time threshold; and in response to an index being used for the column within the time threshold, determining whether a number of times that an index for the column has been used within the time threshold is not less than a preset number-of-times threshold; and determining that an index is not to be established for the column in response to an index not being used for the column within the time threshold or the number of times being less than the number-of-times threshold; and determining that an index is to be established for the column in response to the number of times being not less than the number-of-times threshold.

In some embodiments, the index types at least include a B-Tree index, a Hash index, an inverted index, and a Bitmap index, and determining the index type according to the data information of the column further comprises: determining that the index type is the B-Tree index in response to the column being a continuous value type; determining that the index type is the Hash index in response to a Join occurring in the column; and determining that the index type is the inverted index in response to the number of words in the column being greater than a preset number-of-words threshold; or determining that the index type is the bitmap index in response to the number of words in the column being not greater than a preset number-of-words threshold, a Join not occurring, and the column being a discontinuous value type.

In some embodiments, the method further includes: receiving a retrieval expression; dividing the retrieval expression into a plurality of sub-expressions; querying whether a retrieval result corresponding to a sub-expression of the plurality of sub-expressions exists in a cache; and in response to the retrieval result existing, generating, a retrieval response to be returned to the user according to the retrieval result corresponding to the sub-expression and retrieval results of other sub-expressions; or in response to a retrieval result corresponding to the sub-expression not existing, performing retrieval on the sub-expression by using an index of the column, obtaining a retrieval result corresponding to the sub-expression, and storing the obtained retrieval result in the cache after a retrieval response is generated according to the obtained retrieval result and retrieval results of other sub-expressions.

In some embodiments, before determining, according to the index status information of the column in the database within the preset time threshold, whether an index is to be established for the column, the method further includes: initializing the database; constructing a first set of indexes for each column in the database according to a default index type; and reconstructing a second set of indexes for each column after a preset period of time.

Embodiments of the present application further provide an index establishment device. The device can include: a determination module configured to determine, according to index status information of a column in a database within a preset time threshold, whether an index is to be established for the column; and an establishment module configured to determine an index type according to the data information of the column, and establish an index for the column according to the index type based on a determination that an index is to be established for the column.

In some embodiments, the establishment module is further configured to, in response to the determination that an index is not to be established for the column, determine, after the time threshold, whether an index is to be established for the column.

In some embodiments, the determination module is further configured to: acquire the index status information of the column within the time threshold; determine, according to the index status information, whether an index is used for the column within the time threshold; in response to an index being used for the column within the time threshold, determine whether a number of times that an index has been used within the time threshold is not less than a preset number-of-times threshold; determine that an index is not to be established for the column in response to an index not being used for the column within the time threshold or the number of times being less than the number-of-times threshold; and determine that an index is be established for the column, in response to the number of times being not less than the number-of-times threshold.

In some embodiments, the index types at least comprise a B-Tree index, a Hash index, an inverted index, and a Bitmap index, and the establishment module is further configured to: determine that the index type is the B-Tree index in response to the column being a continuous value type; determine that the index type is the Hash index in response to a Join occurring in the column; and determines that the index type is the inverted index in response to the number of words in the column being greater than a preset number-of-words threshold; or determines that the index type is the bitmap index in response to the number of words in the column being not greater than a preset number-of-words threshold, a Join not occurring, and the column being a discontinuous value type.

In some embodiments, the device can further include: a division module configured to receive a retrieval expression and divide the retrieval expression into a plurality of sub-expressions; a query module configured to query whether a retrieval result corresponding to a sub-expression of the plurality of sub-expressions exists in a cache; a processing module configured to generate, according to the retrieval results of the sub-expressions, a retrieval response to be returned to the user in response to the retrieval result existing, or perform retrieval on the sub-expression by using an index of the column, obtain a retrieval result corresponding to the sub-expression, and store the obtained retrieval result in the cache after a retrieval response is generated according to the obtained retrieval result and retrieval results of other sub-expressions, in response to a retrieval result corresponding to the sub-expression not existing.

In some embodiments, the device can further include an initialization module configured to initialize the database; construct a first set of indexes for each column in the database according to a default index type; and reconstruct a second set of indexes for each column after a preset period of time.

DETAILED DESCRIPTION

Embodiments of the disclosure can determine, according to the index use status of each column in a database, whether an index is to be established for the column, and a suitable index type is selected based on the data information of the column during the establishment of an index. Therefore, the retrieval efficiency can be improved under the premise of saving hardware resources and reducing labor input.

Figure 1:
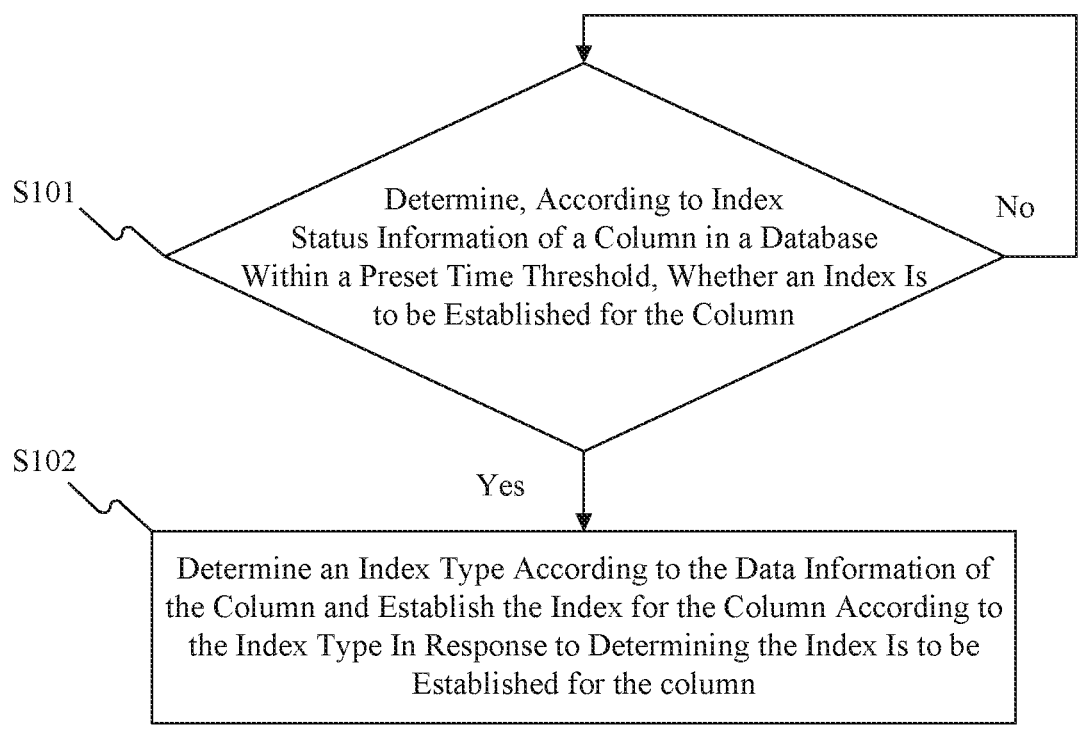
FIG. 1 is a flowchart of an index establishment method, according to embodiments of the present application.

FIG. 1 is a flowchart of an index establishment method, according to embodiments of the present application. The method includes the following steps S101 and S102.

In step S101, it is determined, according to index status information of a column in a database within a preset time threshold, whether an index is to be established for the column.

If it is determined that an index is to be established for the column, step S102 can be performed The method can return to step S101, if it is determined that an index is not to be established for the column.

If the database includes a massive amount of data, it is time consuming, labor consuming, and unnecessary to establish an index for each column in a database as a user does not often retrieve or query all columns. Therefore, in the present application, index status information can be introduced for each column in a database. It can be determined, based on the index status information within a period of time, whether an index needs to be established for the column. Meanwhile, to ensure that the index status information of each column can be adjusted according to the retrieval manners and habits of the user, the index status information of each column can be updated every time threshold. The index status information can include, for example, whether the column has used an index within the time threshold and whether a number of times that the index has been used reaches a particular number. In some embodiments, the time threshold can be a preset time interval value, representing a statistics-collection time range for collecting statistics on the index use status of a column. The time threshold may be adjusted according to a capacity of the database and a number of users. The time threshold may be set to a day, and may be extended or shortened.

In some embodiments of the present application, step S101 can further include: step a): acquiring the index status information of the column within the time threshold, and step b): determining, according to the index status information, whether a current index is used for the column within the time threshold. When the current index is used for the column within the time threshold, it can be determined whether the number of times that the current index has been used within the time threshold is not less than a preset number-of-times threshold.

Therefore, it can be determined that an index is not to be established for the column if the current index is not used for the column within the time threshold or the number of times that the current index has been used for the column within the time threshold is less than the number-of-times threshold. It can also be determined that an index is to be established for the column if the number of times the current index for the column has been used within the time threshold is not less than the number-of-times threshold.

In addition, none of the columns in the database has an established index after the initialization of a database. Therefore, an index can be constructed for each column in the database according to a default index type, and an index can be constructed for each column again when a preset moment is reached. Indexes that are uniformly established may be preset.

In step S102, an index type can be determined according to the data information of the column, and an index can be established for the column according to the index type.

An index type can be determined according to the data information of the column after it is determined in step S101 that an index is to be established for the column. Therefore, based on the determined index type, personalized retrieval services can be provided to users based on different cases, so that the average time of querying the database by all users can be reduced.

If it is determined that an index is not to be established for the column, after the time interval corresponding to a current time threshold ends, it is determined again, according to the index use status information of the column within the time interval corresponding to the next time threshold, whether an index needs to be established for the column. That is, step S101 can be performed again. Therefore, flexible adjustment can be made according to the actual case.

In some embodiments, index types can include Inverted index, B-Tree index, Hash index, and Bitmap index. Accordingly, the index type can be determined as a B-Tree index if the column is a continuous value type, as a Hash index if a Join occurs in the column, as an inverted index if the number of words in the column is greater than a preset number-of-words threshold, as a bitmap index if the number of words in the column is not greater than a preset number-of-words threshold, a Join does not occur, and the column is a discontinuous value type.

It is appreciated that Join is an important operations in a relational database system. Common Joins in an SQL Server include an inner join, an outer join, a cross join, and the like. If data of a row in one table matching with a row in another table is being acquired from two or more tables, the Join operation may be used, as the Join is characterized by joining tables or functions to perform a query.

For the inverted index, the number of words in the column can be the number of variable values included in the column.

Figure 2:
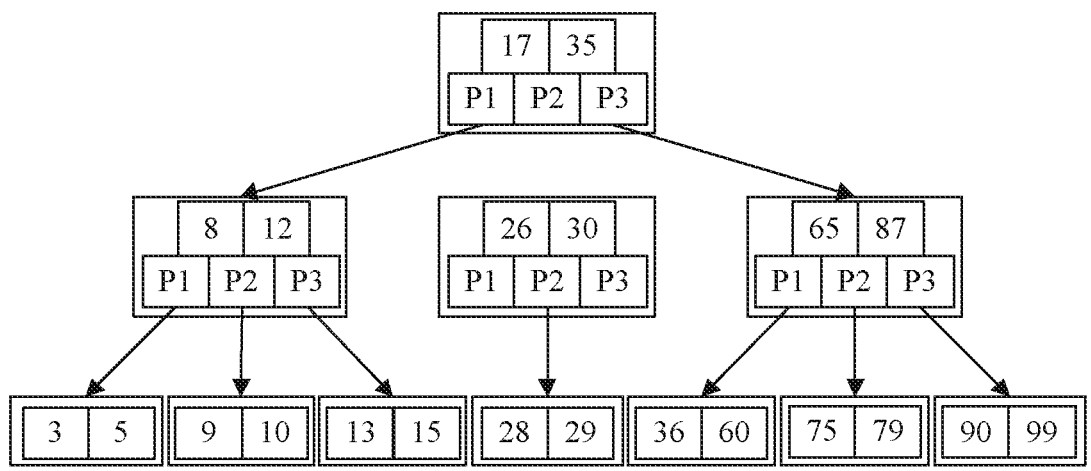
FIG. 2 illustrates a schematic diagram of a data structure, according to embodiments of the present application.

In some embodiments of the present application, if data in a column is a value type and is continuous (for example, a monetary amount), a range query can be performed on a field having the value type. As shown in a data structure of FIG. 2, an intermediate node in the data structure of a B-Tree inherently has a range attribute. Therefore, for a column of a continuous value type, the efficiency of a range search on a B-Tree index can be higher than that of a range search on an inverted index and a bitmap index.

In addition, it is assumed that there are n records in an entire index slice, field A has x different term values, and the compression ratio of an original compression algorithm of "delta+vint" is p, a maximum value of p can be ¼. In this case, a result may be obtained by using an equation "x<128× p" transformed from "x×n/32<n×4×p".

For example, when p=¼, x<128×¼=32 may be obtained.

As can be seen from the foregoing result, if a number of words is less than 32, the space occupied when a bitmap index is used is smaller than that occupied when an inverted index is used. Therefore, the number-of-words threshold may be set to 32. However, it is appreciated that the number-of-words threshold may be subsequently changed based on another algorithm.

Conventionally, after one user query is made, no result information related to the query can be saved. Generally, a query expression of a user is usually formed of a plurality of different sub-expressions. Therefore, if no atomic sub-expression is cached in a database, sub-expression query results cannot be reused for different SQLs having a same expression. As a result, when no atomic sub-expression is cached, the performance of Boolean operations in any dimensions in online analytical processing (OLAP) is poor. Therefore, in some embodiments of the disclosure, a retrieval expression sent by a user can be divided into a plurality of sub-expressions when the retrieval expression is received, and it is queried whether a retrieval result corresponding to each sub-expression exists in a cache.

According to a retrieval result corresponding to the sub-expression and retrieval results of other sub-expressions if the retrieval result exists, a retrieval response can be generated to return the retrieval result to the user.

Retrieval can be performed on the sub-expression by using an index of the column if a retrieval result corresponding to the sub-expression does not exist, and the retrieval result can be stored in the cache after a retrieval response to be returned to the user is generated according to the retrieval result and retrieval results of other sub-expressions.

Figure 3:
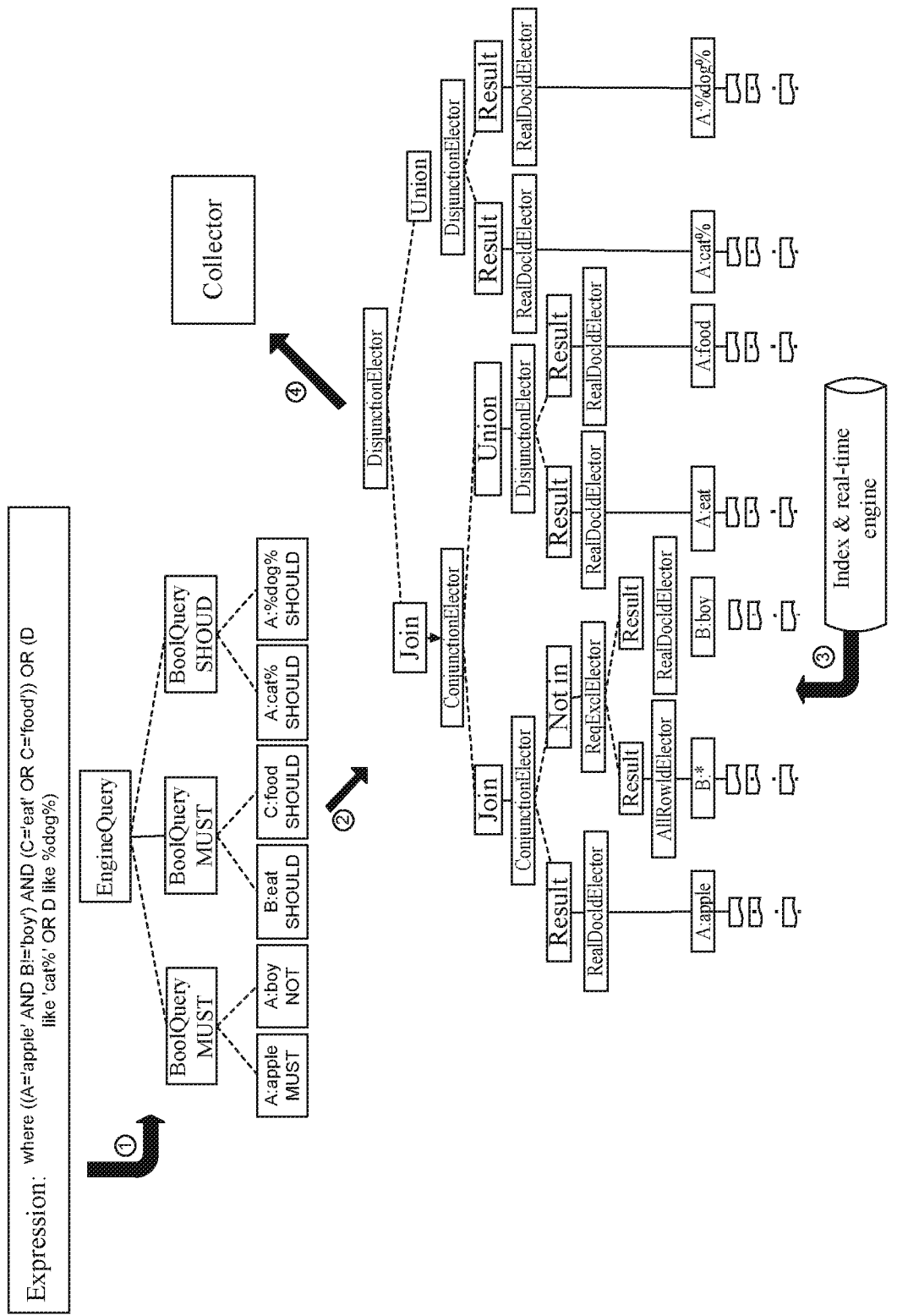
FIG. 3 is a flowchart of streamed result merging, according to embodiments of the present application.

FIG. 3 illustrates a flowchart of streamed result merging, according to embodiments of the disclosure. An inverted link obtained through decompression after an index is queried can be stored in the memory by using a bitmap structure. In a streamed merging framework, Boolean operations between expressions can be obtained one by one through merging under the premise of not generating any intermediate objects. The entire streamed merging process can include four steps as below.

In a first step, a queue creation component (e.g., a Query Builder) can generate an object tree of a queue engine (e.g., an Engine Query), according to a "where" expression.

In a second step, a selector tree of a row identification (ID) elector (e.g., a RowidElector) can be constructed according to the object tree of the Engine Query.

In a third step, a row ID set (e.g., Rowid Set) obtained from different indexes can be inserted on a leaf node, where an intermediate node is a logic operation merger.

In a fourth step, election can be performed on root nodes one by one, and a row ID can be collected.

The above example is based on a case in which different SQL statements may have a same "where" sub-expression. Therefore, an atomic sub-expression can be cached to accelerate index query performance.

According to embodiments of the disclosure, based on an index structure that is independent on a column level, the most suitable index type can be automatically selected according to costs and expenses, and history statistics (HBO) can be used to automatically adjust the index type, and an atomic sub-expression can be cached at a same time. Therefore, index query performance can be accelerated while storage costs are reduced.

Figure 4:
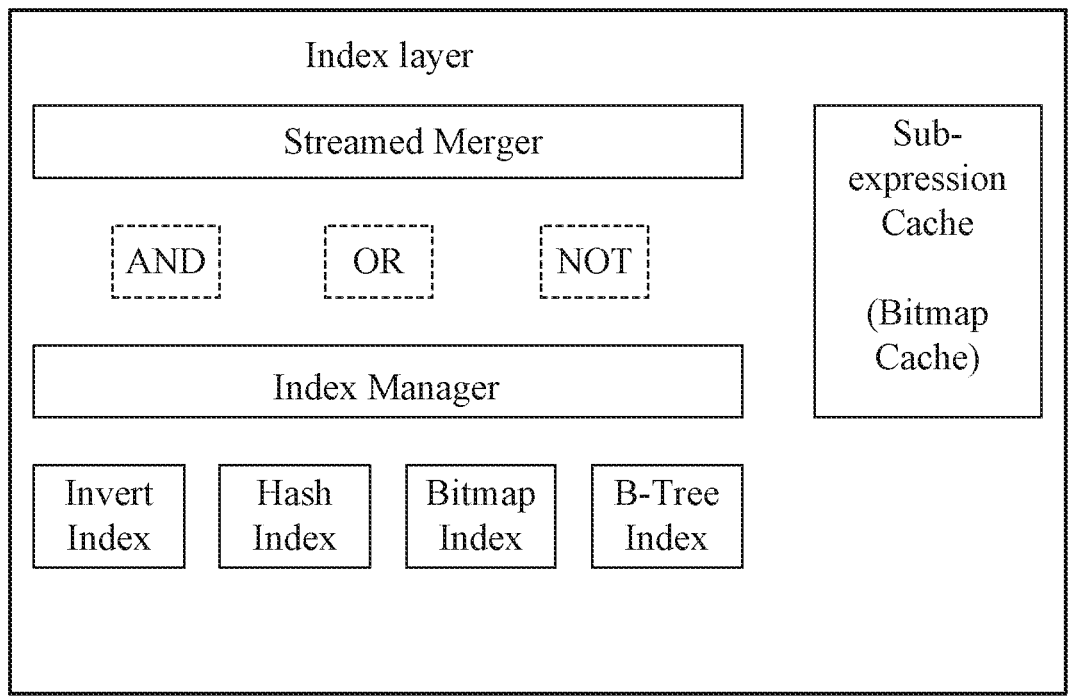
FIG. 4 illustrates a schematic structural diagram of an index, according to embodiments of the present application.

FIG. 4 illustrates a schematic structural diagram of an index, according to embodiments of the present application. In some embodiments, the column-level index architecture shown in FIG. 4 can be autonomously implemented based on the principles and characteristics of indexes, such as an inverted index, bitmap index, Hash index, and B-Tree index. All four index types can be supported. The index types can be transparent to a user and may not be specified externally by the user. Instead, an index type can be automatically selected according to data features. Moreover, the multiple index types can use a same data structure to perform Boolean operations. An index from which a "where" sub-expression result is found may not be perceived on an engine layer. In addition, an index may be automatically optimized according to history statistics information without manual involvement.

In some embodiments, the structural diagram of an index mainly can include: a streamed merger, an index manager, and a sub-expression cache.

The streamed merger can unify query results of different indexes and interaction between computation layers. Results from queries using different indexes can be stored by using a bitmap. A streamed merge tree can then be generated according to Boolean operations of a "where" expression, and the streamed merger then can output row numbers that satisfy a "where" condition, one by one.

The index manager is responsible for index management, type selection, and automatic index optimization procedures.

The sub-expression cache (e.g., a Bitmap Cache) can cache the "where" sub-expressions. Therefore, an index may not be queried when different SQLs have a same sub-expression, and a query may be directly made in the cache.

Figure 5:
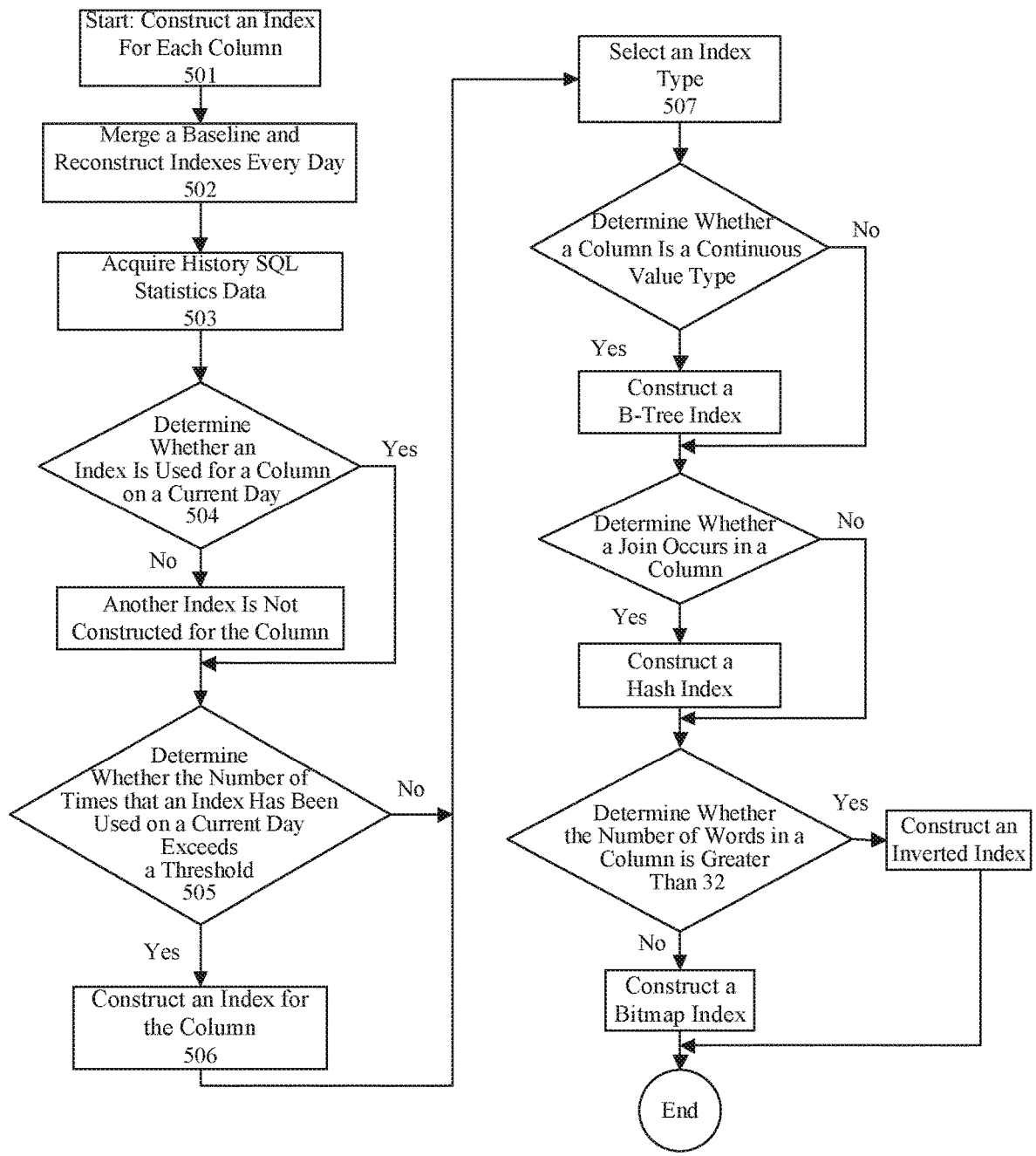
FIG. 5 is a flowchart of establishing an index, according to embodiments of the present application.

Based on the foregoing description, in a schematic flow-chart of establishing an index as shown in FIG. 5, an index can be first established for each column in a database (501), and an index can be established again on a periodic basis (e.g., every day) (502) and history SQL statistics data can be acquired (503). It is determined, based on the history data, whether an index is used for the column on the current day (504) and whether the number of times that an index has been used exceeds a threshold (505). A different index type can be selected (507) according to the type of data in the column after it is determined that an index is to be established for the column (506). Therefore, not only does it support the use of different index types (an inverted index, a B-Tree index, a Bitmap index, and a Hash index are all supported) for fields in different columns, but also an index type can be selected without being perceived by a user, so that storage costs can be saved and query speed can be increased.

Figure 6:
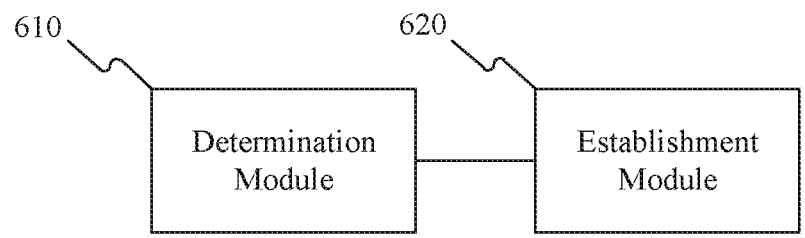
FIG. 6 illustrates a schematic structural diagram of an index establishment device, according to embodiments of the present application.

Embodiments of the present application further provide an index establishment device. As shown in FIG. 6, the device includes: a determination module 610 and an establishment module 620.

Determination module 610 can determine, according to the index status information of a column in a database within a preset time threshold, whether an index is to be established for the column; and Establishment module 620 can determine an index type according to the data information of the column and establish an index for the column according to the index type when the determination module determines that an index is to be established for the column.

In some embodiments, the establishment module can further determine, after the time threshold and according to index use status information of the column within the time threshold, whether an index is to be established for the column when the determination module determines that an index is not to be established for the column.

In some embodiments, determination module 610 can further acquire the index status information of the column within the time threshold; determine, according to the index status information, whether a current index is used for the column within the time threshold, and when the current index is used for the column within the time threshold, determine whether the number of times the current index for the column is used within the time threshold is not less than a preset number-of-times threshold; and determine that an index is not being established for the column if the current index is not used for the column within the time threshold or the number of times an index for the column is used within the time threshold is less than the number-of-times threshold; or determine that an index needs to be established for the column if the number of times the current index for the column has been used within the time threshold is not less than the number-of-times threshold.

In some embodiments, the index types at least include a B-Tree index, a Hash index, and a Bitmap index, and the establishment module can determine that the index type is a B-Tree index if the column is a continuous value type; determine that the index type is a Hash index if a join occurs in the column; and determines that the index type is an inverted index if the number of words in the column is greater than a preset number-of-words threshold; or determine that the index type is a bitmap index if the number of words in the column is not greater than a preset number-of-words threshold, a Join does not occur, and the column is a discontinuous value type.

In some embodiments, the device further includes a division module, a query module, and a processing module. The division module can be configured to divide a retrieval expression sent by a user into a plurality of sub-expressions when the retrieval expression is received. The query module can be configured to query whether a retrieval result corresponding to each sub-expression exists in a cache. The processing module can be configured to generate, according to a retrieval result corresponding to the sub-expression and retrieval results of other sub-expressions, a retrieval response to be returned to the user when the retrieval result exists, or perform retrieval on the sub-expression by using an index of the column when a retrieval result corresponding to the sub-expression does not exist, and store the retrieval result in the cache after a retrieval response to be returned to the user is generated according to the retrieval result and retrieval results of other sub-expressions.

In some embodiments, the device further includes an initialization module that can be configured to construct an index for each column in the database according to a default index type after the database has been initialized and to construct an index for each column again when a preset moment is reached.

According to embodiments of the disclosure, an index can be dynamically established for each column in a database, and a suitable index type can be selected according to the actual case, so that data retrieval efficiency can be effectively improved under the premise of reducing resource consumption and labor input.

It is appreciated that the present disclosure may be implemented by using software or software plus a hardware platform. Based on such an understanding, the technical solutions of the present invention may be implemented in the form of a software product. The software product may be stored in a non-volatile and/or non-transitory storage medium (which may be a CD-ROM, a USB flash drive, a removable hard disk, or the like), and includes several instructions for instructing a computer device (which may be a personal computer, a server, a network device, or the like) to perform the methods in the implementation scenarios of the present invention.

It is appreciated that the accompanying drawings are only schematic diagrams of a preferred implementation scenario. The modules or procedures in the accompanying drawings are not necessarily indispensable for implementing the present invention.

It is appreciated that the modules in the apparatus in the implementation scenario may be distributed in the apparatus in the implementation scenario according to the description of the implementation scenario, or may be correspondingly changed to be located in one or more apparatuses different from the apparatus in the implementation scenario. The modules in the foregoing implementation scenario may be combined into one module or may further be divided into a plurality of submodules.

The foregoing sequence numbers in the present invention are merely for the convenience of description, and do not imply preference among the implementation scenarios.

The foregoing disclosure is only several specific implementation scenarios of the present invention, but the present invention is not limited thereto. Any change conceivable by a person skilled in the art shall fall within the protection scope of the present invention.

What is claimed is:

1. An index establishment method, comprising:
   determining, according to index status information of a column in a database within a time threshold, whether an index is to be established for the column, wherein determining whether the index is to be established for the column comprises:
     acquiring the index status information of the column within the time threshold,
     determining, according to the index status information, whether a current index is used for the column within the time threshold,
     in response to the current index being used for the column within the time threshold, determining whether a number of times that the current index has been used within the time threshold is not less than a preset number-of-times threshold, and
     determining that an index is to be established for the column, in response to the number of times the current index has been used being not less than the number-of-times threshold;
   determining an index type of a plurality of index types according to the data information of the column, wherein the plurality of index types comprise a B-Tree index and a Hash index and the determined index type is:
     the B-tree index when the column is a continuous value type, and
     the Hash index when a Join occurs in the column; and
   establishing an index for the column according to the index type based on a determination that an index is to be established for the column.

2. The method of claim 1, further comprising:
   in response to the determination that an index is not to be established for the column, determining, after the time threshold, whether an index is to be established for the column.

3. The method of claim 2, wherein determining, according to the index status information of the column in the database within the preset time threshold, whether an index is to be established for the column further comprises:

determining that an index is not to be established for the column, in response to the current index not being used for the column within the time threshold or the number of times that the current index has been used being less than the number-of-times threshold.

4. The method of claim 1, wherein the plurality of index types further comprise an inverted index and a Bitmap index, and the determined index type is:
   the inverted index in response to the number of words in the column being greater than a preset number-of-words threshold; and
   the bitmap index in response to the number of words in the column being not greater than a preset number-of-words threshold, a Join not occurring, and the column being a discontinuous value type.

5. The method of claim 1, further comprising:
   receiving a retrieval expression;
   dividing the retrieval expression into a plurality of sub-expressions;
   querying whether a retrieval result corresponding to a sub-expression of the plurality of sub-expressions exists in a cache; and
   in response to the retrieval result existing, generating a retrieval response to be returned to the user according to the retrieval result corresponding to the sub-expression and retrieval results of other sub-expressions; or
   in response to a retrieval result corresponding to the sub-expression not existing, performing retrieval on the sub-expression by using an index of the column, obtaining a retrieval result corresponding to the sub-expression, and storing the obtained retrieval result in the cache after a retrieval response is generated according to the obtained retrieval result and retrieval results of other sub-expressions.

6. The method of claim 1, further comprising, before determining, according to the index status information of the column in the database within the preset time threshold, whether an index is to be established for the column:
   initializing the database;
   constructing a first set of indexes for each column in the database according to a default index type; and
   reconstructing a second set of indexes for each column after a preset period of time.

7. An index establishment device, comprising:
   a memory storing a set of instructions, and
   one or more processors configured to execute the set of instructions to cause the device to perform:
     determining, according to index status information of a column in a database within a preset time threshold, whether an index is to be established for the column, wherein determining whether the index is to be established for the column comprises:
       acquiring the index status information of the column within the time threshold,
       determining, according to the index status information, whether a current index is used for the column within the time threshold,
       in response to the current index being used for the column within the time threshold, determining whether a number of times that the current index has been used within the time threshold is not less than a preset number-of-times threshold, and
       determining that an index is to be established for the column, in response to the number of times that the current index has been used being not less than the number-of-times threshold; and determining an index type of a plurality of index types according to the data information of the column, wherein the plurality of index types comprise a B-Tree index and a Hash index and the determined index type is:
the B-tree index when the column is a continuous value type, and
the Hash index when a Join occurs in the column; and
establishing an index for the column according to the index type based on a determination that an index is to be established for the column.

8. The device of claim 7, wherein the one or more processors are further configured to execute the set of instructions to cause the device to perform:
in response to the determination that an index is not to be established for the column, determining, after the time threshold, whether an index is to be established for the column.

9. The device of claim 8, wherein the one or more processors are further configured to execute the set of instructions to cause the device to perform:
determining that an index is not to be established for the column in response to the current index not being used for the column within the time threshold or the number of times the current index has been used being less than the number-of-times threshold.

10. The device of claim 8, wherein the plurality of index types further comprise an inverted index and a Bitmap index, and the determined index type is:
the inverted index in response to the number of words in the column being greater than a preset number-of-words threshold; or
the bitmap index in response to the number of words in the column being not greater than a preset number-of-words threshold, a Join not occurring, and the column being a discontinuous value type.

11. The device of claim 8, wherein the one or more processors are further configured to execute the set of instructions to cause the device to perform:
receiving a retrieval expression and divide the retrieval expression into a plurality of sub-expressions;
querying whether a retrieval result corresponding to a sub-expression of the plurality of sub-expressions exists in a cache;
generating, according to the retrieval results of the sub-expressions, a retrieval response to be returned to the user in response to the retrieval result existing, or
performing retrieval on the sub-expression by using an index of the column, obtaining a retrieval result corresponding to the sub-expression, and storing the obtained retrieval result in the cache after a retrieval response is generated according to the obtained retrieval result and retrieval results of other sub-expressions, in response to a retrieval result corresponding to the sub-expression not existing.

12. The device of claim 8, wherein the one or more processors are further configured to execute the set of instructions to cause the device to perform:
initializing the database;
constructing a first set of indexes for each column in the database according to a default index type; and
reconstructing a second set of indexes for each column after a preset period of time.

13. A non-transitory computer readable medium that stores a set of instructions that is executable by at least one processor of a computing system to cause the computing system to perform an index establishment method, the method comprising:
determining, according to index status information of a column in a database within a preset time threshold, whether an index is to be established for the column wherein determining whether the index is to be established for the column comprises:
acquiring the index status information of the column within the time threshold,
determining, according to the index status information, whether a current index is used for the column within the time threshold,
in response to the current index being used for the column within the time threshold, determining whether a number of times that the current index has been used within the time threshold is not less than a preset number-of-times threshold, and
determining that an index is to be established for the column, in response to the number of times the current index has been used being not less than the number-of-times threshold;
determining an index type of a plurality of index types according to the data information of the column, wherein the plurality of index types comprise a B-Tree index and a Hash index and the determined index type is:
the B-tree index when the column is a continuous value type, and
the Hash index in response when a Join occurs in the column; and
establishing an index for the column according to the index type based on a determination that an index is to be established for the column.

14. The non-transitory computer readable medium of claim 13, wherein the method further comprises:
in response to the determination that an index is not to be established for the column, determining, after the time threshold, whether an index is to be established for the column.

15. The non-transitory computer readable medium of claim 14, wherein determining, according to the index status information of the column in the database within the preset time threshold, whether an index is to be established for the column further comprises:
determining that an index is not to be established for the column, in response to the current index not being used for the column within the time threshold or the number of times the current index has been used being less than the number-of-times threshold.

16. The non-transitory computer readable medium of claim 13, wherein the plurality of index types further comprise an inverted index and a Bitmap index, and the determined index type is:
the inverted index in response to the number of words in the column being greater than a preset number-of-words threshold; and
the bitmap index in response to the number of words in the column being not greater than a preset number-of-words threshold, a Join not occurring, and the column being a discontinuous value type.

17. The non-transitory computer readable medium of claim 13, further comprising:
receiving a retrieval expression;
dividing the retrieval expression into a plurality of sub-expressions;

querying whether a retrieval result corresponding to a sub-expression of the plurality of sub-expressions exists in a cache; and in response to the retrieval result existing, generating, according to the retrieval results of the sub-expressions, a retrieval response to be returned to the user, or in response to a retrieval result corresponding to the sub-expression not existing, performing retrieval on the sub-expression by using an index of the column, obtaining a retrieval result corresponding to the sub-expression, and storing the obtained retrieval results in the cache after a retrieval response is generated according to the obtained retrieval results of the sub-expressions.

18. The non-transitory computer readable medium of claim 13, further comprising, before determining, according to the index status information of the column in the database within the preset time threshold, whether an index is to be established for the column:

initializing the database;

constructing a first set of indexes for each column in the database according to a default index type; and reconstructing a second set of indexes for each column after a preset period of time.

* * * * *